Aug. 11, 1959  C. S. SIMPELAAR  2,899,171
DAMPER CONSTRUCTION
Filed April 23, 1956  3 Sheets-Sheet 2
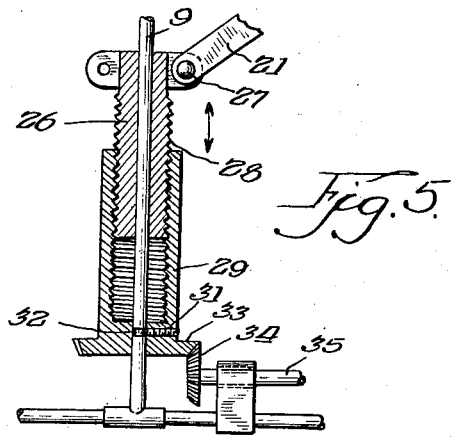
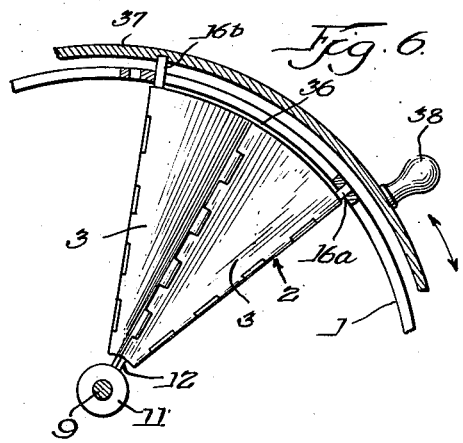
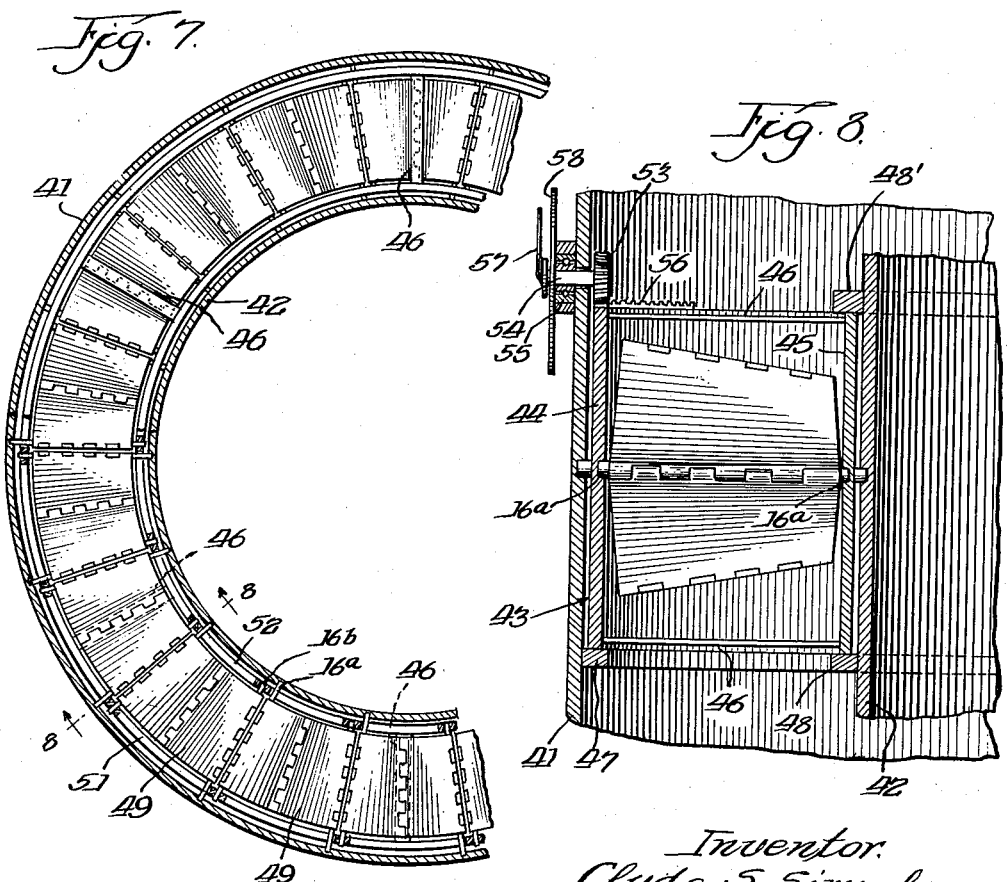
Inventor.
Clyde S. Simpelaar.
By Aug. 11, 1959
C. S. SIMPELAAR
2,899,171
DAMPER CONSTRUCTION
Filed April 23, 1956
3 Sheets-Sheet 3
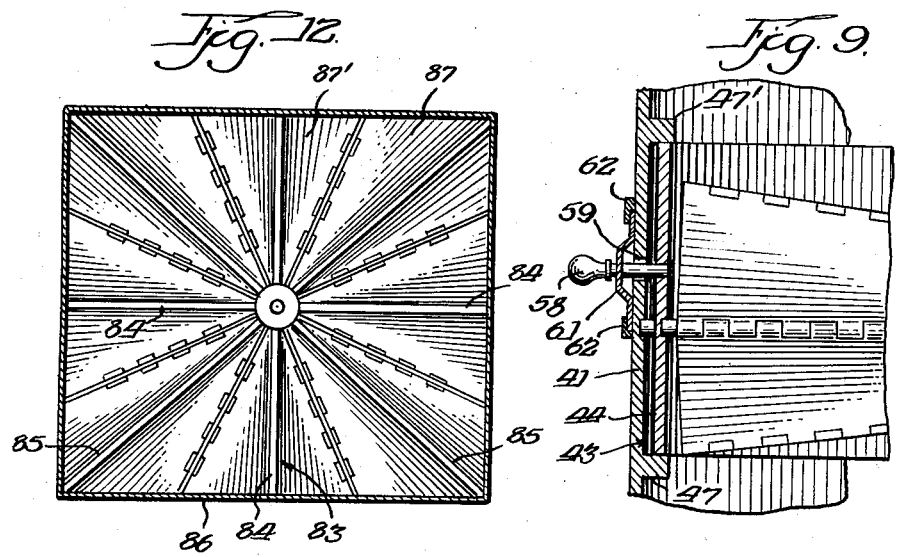
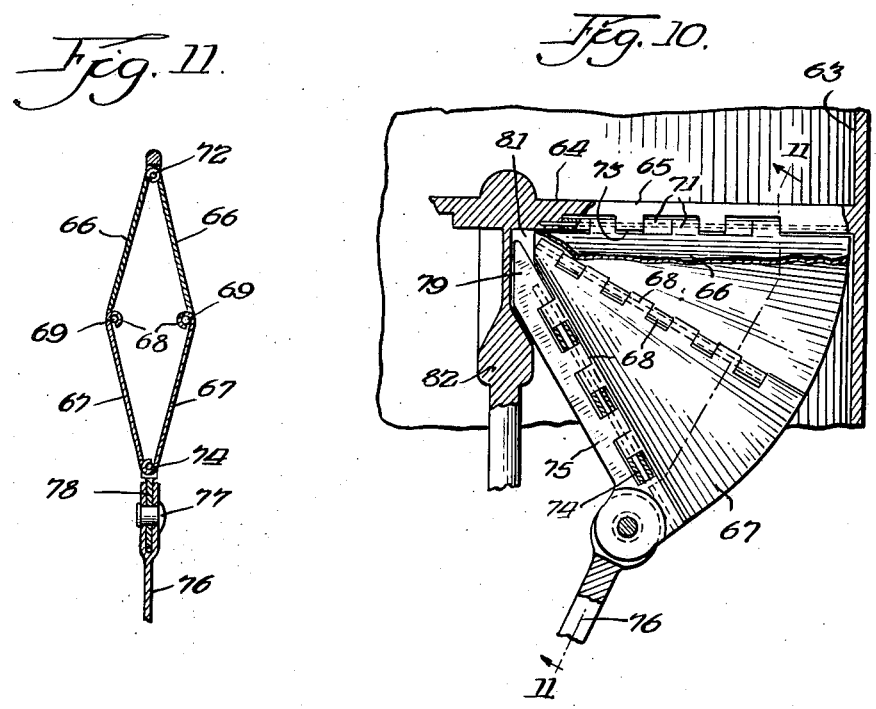
Inventor:
Clyde S. Simpelaar.
By
Attys.

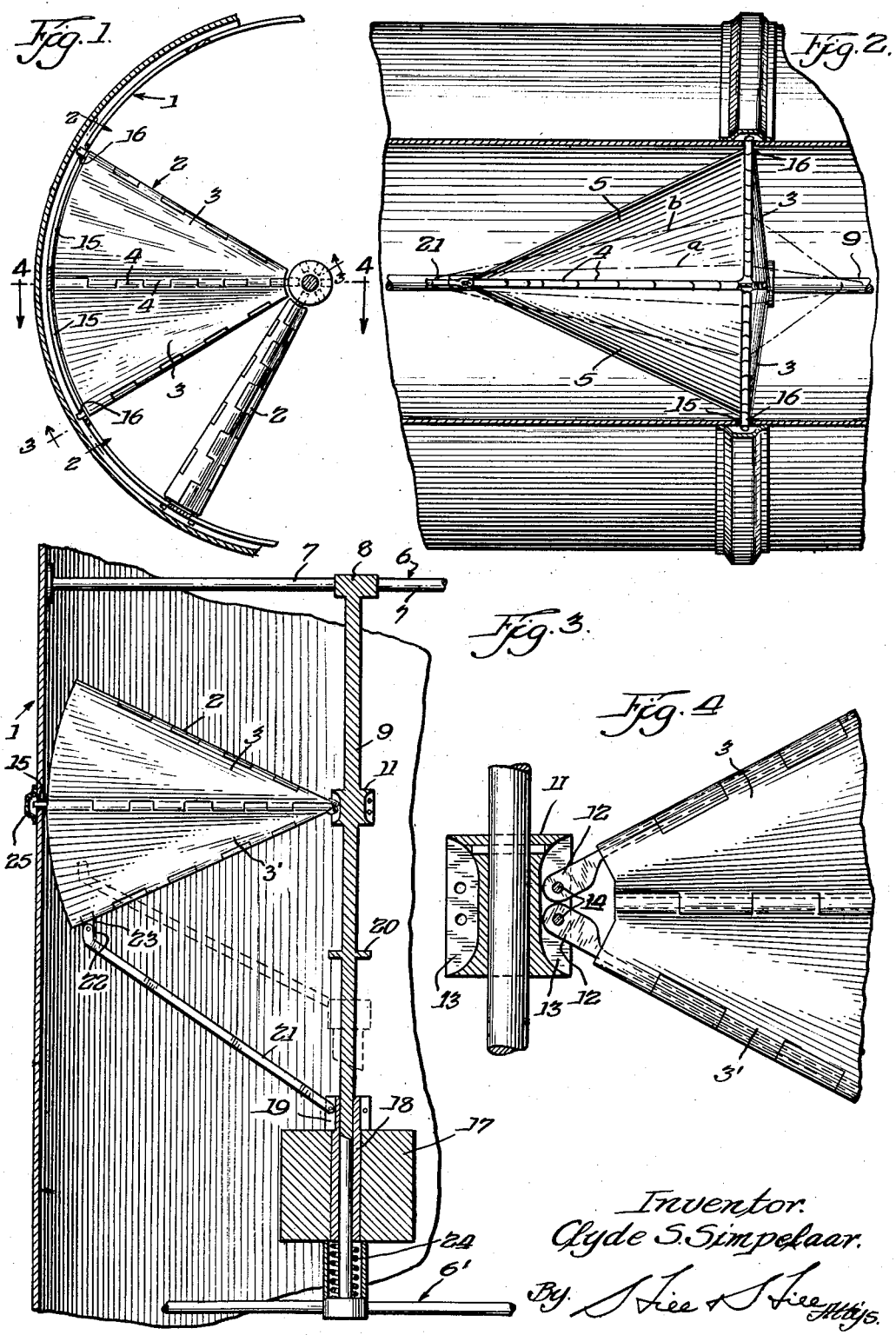

United States Patent Office 2,899,171
Patented Aug. 11, 1959

2,899,171

DAMPER CONSTRUCTION

Clyde S. Simpelaar, Racine, Wis., assignor to Modine Manufacturing Company, Racine, Wis., a corporation of Wisconsin Application April 23, 1956, Serial No. 579,795

7 Claims. (Cl. 251—138)

The invention relates generally to damper structures and more particularly to a collapsible vane type damper or valve, particularly adapted for circular and toroidal conduits and the like.

The invention is an improvement over dampers of the type illustrated in my prior Patent No. 2,505,996, issued May 2, 1950, and Patent No. 2,672,088, issued to John L. Orr on March 16, 1954, entitled Air Flow Control Damper. Prior devices of this type have employed parallel extending dampers which may be extended or collapsed to close or open the duct in which they are positioned, and have been adapted primarily for use in ducts of rectangular cross section. The present invention therefore has among its objects the production of a damper construction which may be readily employed in circular ducts as well as ducts of other cross section, as for example, hexagonal, toroidal, etc., as well as rectangular ducts, if desired.

Another object of the invention is the provision of a damper structure having the advantages of the collapsible vane type structures which may readily be constructed to utilize a symmetrical disposition of the damper elements about the longitudinal axis of the duct in which they are to be positioned.

A further object of the invention is the provision of such a damper structure which is relatively simple in construction, inexpensive to manufacture, durable, and very efficient in use.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a transverse sectional view through a portion of the duct, illustrating a damper construction including several damper elements mounted therein;

Fig. 2 is a sectional view taken approximately on the line 2—2 of Fig. 1;

Fig. 3 is a sectional view of a modified damper construction taken approximately on the line 3—3 of Fig. 1, illustrating one form of supporting means and damper actuating mechanism;

Fig. 4 is a sectional view of the modified damper construction of Fig. 3 taken approximately on the line 4—4 of Fig. 1, looking in the direction of the arrows, illustrating details of the mounting of the inner portion of each damper element to the supporting structure;

Fig. 5 is a sectional view similar to Fig. 3 of a modified form of damper actuating mechanism;

Fig. 6 is a sectional view similar to Fig. 1 through a portion of a duct structure, illustrating a modified form of actuating means for the damper elements;

Fig. 7 is a sectional view through a toroidal shaped duct, illustrating the application of the present invention thereto;

Fig. 8 is a sectional view taken approximately on the line 8—8 of Fig. 7, illustrating actuating means for the damper assembly;

Fig. 9 is a sectional view similar to Fig. 8, illustrating a modified form of actuating means for a toroidal type structure such as illustrated in Figs. 7 and 8;

Fig. 10 is a sectional view through a portion of a duct, illustrating another modified structure of damper assembly;

Fig. 11 is a sectional view taken approximately on the line 11—11 of Fig. 10; and Fig. 12 is a transverse sectional view through a rectangular shaped duct, illustrating the application of the present invention thereto.

The present invention contemplates the use of damper elements which may be arranged radially about the central axis of the duct in which they are to be positioned as distinguished from prior structures which normally involved damper elements disposed along parallel lines. Thus the present invention provides a structure which may be radially disposed within a circular or other shaped duct, with the symmetrical arrangement of the damper elements about the axis of the duct providing an efficient symmetrically balanced flow through the damper structure, which obviously could not be achieved with a parallel damper arrangement.

Referring to the drawings, and more particularly Figs. 1 through 4, the reference numeral 1 indicates generally a duct of circular cross section, in which are positioned a plurality of damper elements indicated generally by the numeral 2, only two of such elements being illustrated in Fig. 1. Each damper element 2 in the embodiment illustrated in Figs. 1 and 2 comprises a pair of side wall plates or members 3 of sheet metal or the like, having cooperable hinge lugs 4 along their adjacent edges, adapted to receive a pivot pin or pintle, by means of which the two walls may be pivotally connected. Pivotally connected to the free side edges of the walls 3 by cooperable lugs 4 in substantially the same manner are a pair of relatively larger walls or plates 5, which in turn are pivotally connected along their free edges by a similar hinge construction utilizing cooperable lugs 4, as clearly illustrated in Fig. 2. The arrangement is such that the pivotal axes of the side walls converge to a common center whereby the resulting structure may be positioned with its side walls arranged in the form of a pyramid, the apexes of the side walls, however, terminating somewhat short of such center whereby the resulting structure more specifically might be termed a hollow truncated pyramid which is open at its base. As hereinafter more specifically described, the base edges of the pyramidal structure may be of any suitable configuration to conform to the duct involved when in closed position.

It will be apparent that the pyramidal structure above described may be readily folded or collapsed about any two oppositely disposed pivotal axes, the amount of folding or collapsing of course depending upon the relative sizes of the cooperable pairs of side walls. Thus in the event the side walls are of more or less uniform size and shape, the folding or collapsing will be about the same amount irrespective of which pair of axes are utilized, while in the case of unequal walls such as illustrated in Fig. 2, the larger walls will substantially fully collapse when the structure is folded along one pair of axes, and only partially open when folded along the other pair of axes.

It will be appreciated that when the walls 3 of the damper elements 2 are rotated into their extended position as illustrated in solid lines in Fig. 2, they may be arranged to cover a sector of the cylindrical duct 1, such arrangement involving the disposition of the pivotal axes, between each side wall 3 and the adjacent side wall 5, in a common plane extending transverse to the axis of the duct 1, with sufficient number of damper elements being utilized to close the duct when all of the damper elements are disposed in an extended position such as illustrated in Fig. 2, whereby the walls 3 effectively close a respective sector of the duct area. On the other hand, when the dampers are moved to an open position, wherein the damper structures are folded to the position illustrated in the lower portion of Fig. 1 and as indicated in the dot-dash line $a$ of Fig. 2, each damper element presents a minimum amount of resistance to the air flow through the duct. Obviously while Fig. 1 illustrates only two damper elements 2, one of which is illustrated in an "open" position and the other in a "duct-closing" position, obviously all damper elements will be operated simultaneously in open, closed or intermediate positions and as many damper elements being utilized as may be necessary to completely close the duct when the elements are in duct-closing position, such number being dependent upon the area of the sector covered by each individual damper element. It will also be appreciated with reference to Figs. 1 and 2, that in the event equal side walls are utilized for the damper element the side walls corresponding to the walls 5 in the construction illustrated in Fig. 2 would approach a similar but opposite position to the walls 3 when the latter are in either open or closed position, in which case the cross sectional arrangement of the walls would be approximately the same irrespective of whether the damper element was in open or closed position, the main distinction being that in one position the general plane of the folded structure is substantially at right angles to the plane of the structure when folded into the other position.

Figs. 3 and 4 illustrate details of a supporting and actuating structure for the damper elements, the latter illustrated in these figures utilizing walls 3 and 3' of substantially uniform size, the details of the supporting structure as well as the mechanism for opening and closing the dampers may, however, be identical for either type element.

In the embodiment illustrated in Figs. 3 and 4, the damper element 2 is supported adjacent its inner end from a spider assembly indicated generally by the numeral 6, having a plurality of radially extending legs 7 adapted to be suitably engaged with the wall of the duct 1. Depending from the central portion 8 of the spider 6 is a rod-like member 9, supported at its lower end by a similar spider 6' whereby the rod 9 extends along the axis of the duct. Carried by the rod 9 is a collar or hub 11 which is adapted to support the inner apex end of each damper element 2, such connection in the embodiment illustrated in Figs. 3 and 4 comprising an extension 12 of the upper and lower pivot pins respectively connecting the upper pair and the lower pair of the leaves 3, each extension 12 extending into a slot or recess 13 in the hub 11 and pivotally connected thereto by suitable means such as pins 14, whereby the pivot pins may be rotated about their conection with the hub 11 in a common vertical plane. The outer or base portions of each damper element are supported, in the embodiment of the invention illustrated in Figs. 1 and 3, by the duct 1 which may be provided with circumferentially extending slots 15 of a size to receive pivot members 16 axially aligned with the pivot pins connecting the respective walls 3' or 5, as the case may be, with the adjacent wall 3, the pivot members 16 being suitably formed, as for example, as an extension of the pivot rod similar to the arrangement of the inner ends 12 illustrated in Fig. 4, or may be formed from one of the adjacent side walls. This construction thus permits the pivot members 16 to move circumferentially toward and away from the plane of the other two pivot rods, the inner ends of which are pivotally connected to the hub 11, so that upon rotation of the vertically aligned axes of the walls 3 and 3', as viewed in Fig. 3 about the pins 14, the other two axes will rotate or pivot about the axis of the duct, the slots 15 maintaining the latter pair of axes in substantially a common plane passing through the slots 15.

Fig. 3 also illustrates novel means for moving the damper elements 2 from a duct closing position to open position, the particular structure illustrated in Fig. 3 being adapted to be magnetically actuated and may comprise a solenoid winding 17 encircling the rod 9, and an armature 18 which is movable along the rod. The armature 18 may terminate at its upper end in a hub 19 to which is pivotally connected a plurality of actuating arms 21, one for each damper element 2, the opposite end of each arm 21 pivotally connected at 22 to a lug 23 carried by the damper element and independently pivoted on the pivot rod operatively conecting the leaves 3', whereby the bracket or lug 23 is free to pivot on such axis independently of rotation of the leaves 3'. It will be apparent that when the armature 18 and hub 19 are moved upwardly to a position indicated in dotted lines in Fig. 3, each damper element 2 will be moved into its closed position as illustrated in Figs. 1 and 2, whereas when the armature is in the position illustrated in Fig. 3 the damper elements 2 will be folded into an open position as illustrated in Fig. 1 and in dotted lines $a$ in Fig. 2, the broken lines $b$ in Fig. 2 illustrating an intermediate position. The armature 18 may be biased as for example in an upward direction by a spring 24 whereby upon actuation of the solenoid winding 17 the armature will be withdrawn into the solenoid in opposition to the action of the spring 24, upward movement as viewed in Fig. 3 of the armature being limited by any suitable means, as for example, a flange 20 on the rod 9. Thus the opening and closing may be controlled by a switch operative to actuate or de-actuate the solenoid winding 17.

The slots 15 in the side wall of the duct 1 may be sealed at the exterior thereof by a suitable channel strip 25 which extends around the duct and is secured thereto by any suitable means as for example bonding, screws, etc. Obviously where a thick walled duct is employed, the slot for the pivots 16 may be formed as a groove in the inner face of the duct or may be otherwise fabricated to provide a suitable structure.

If desired the actuation of the damper element 2 may be accomplished by rotatable means, either manually actuated or motor driven, an example of such construction being illustrated in Fig. 5, wherein the arms 21 are pivotally connected to a sleeve 26 as indicated at 27, the sleeve being axially slidable along the rod 9 and provided with external threads 28. Cooperable with the sleeve 26 is a rotatable internally threaded nut member 29 which is freely rotatable about the rod 9 but is prevented from moving axially along the rod by suitable means, as for example, a screw 31 or a pin engageable in a cooperable slot 32 in the rod 9. The lower end of the nut member 29 is provided with a bevel gear 33 which may be meshed with a cooperable beveled pinion 34 carried by a radially extending shaft 35 which may run to the exterior of the duct. It will be appreciated that while additional means, if desired, could be provided, the arms 21 prevent rotation of the sleeve 26 relative to the rod 9, as a result of which rotation of the nut 29 by means of the shaft 35 and gears 33 and 34 will result in axial movement of the sleeve 26, and either retraction into the nut 29 or extension therefrom to actuate the damper elements 2. Obviously with this construction the damper elements may be readily controlled and adjusted to any desired intermediate position from fully open to fully closed, and by use of selsyn motors, for example, remote control of the dampers may be provided.

Fig. 6 illustrates the use of the pivots 16 to adjust the positions of the damper elements. In this construction one of the pivots 16a is rotatably carried in a bore extending through the duct wall 1, whereby the pivot is free to rotate but otherwise maintained on a fixed axis. In like manner the opposite pivot 16b passes through a circumferentially extending slot 36 into a movable sleeve member 37. The inner end of the damper structure may be supported in the same manner as illustrated in Fig. 4, whereby the associated pivot pins may rotate within a vertically extending plane. Thus by rotating the sleeve 37 relative to the duct 1, the pivots 16a and 16b are moved relative to the duct 1, the pivots 16a and 16b are moved relative to one another and either separated or drawn together to respectively close or open the damper elements. The sleeve 37 may be provided with a suitable actuating member, as for example, a handle 38 and suitable means may be provided for preventing the flow of air through the slot 36 to the duct exterior.

While I have illustrated in Figs. 1 through 6 a damper construction in connection with hollow ducts such as the cylindrical ducts illustrated, and utilizing a more or less pyramidal shaped damper structure, the invention is equally applicable to toroidal shaped ducts, an example of such type of structure being illustrated in Figs. 7, 8 and 9.

In this embodiment of the invention, the toroidal duct comprises two concentric duct members 41 and 42 forming the duct passage therebetween. Positioned in the toroidal duct is a damper supporting structure indicated generally by the numeral 43 comprising, in the embodiment illustrated, a pair of concentrically arranged tubes or sleeves 44 and 45 connected together by a plurality of radially extending ribs 46 positioned adjacent the free edges of the members to form a rigid, unitary structure, the latter being supported in the duct by suitable means such as opposed flange rings 47 and 48, respectively carried by the duct members 41 and 42, upon which the structure 43 may rest. Axial movement of the structure 43 in the opposite direction may be restricted by a similar ring 48' carried by the inner duct member 42 and adapted to engage the top edge of the inner sleeve 45.

As clearly illustrated in Fig. 7, the damper elements 49 are constructed in substantially the same manner as the elements 2 heretofore described, with the exception that instead of being truncated by omission of only a small portion of their pointed ends, they are truncated by omission of a considerably greater portion of their pointed ends. In this particular embodiment of the invention both ends of the damper elements 49 are supported in a manner similar to the outer portions of the damper elements 2 illustrated in Fig. 6, the extensions or pivot pins 16a being supported by the sleeves 44 and 45, with the pivots being rotatable on their supports but otherwise maintained on a fixed axis. In like manner the pivots 16b at each end of the damper structure may extend through circumferentially extending slots 51 and 52 in the sleeve members 44 and 45, respectively, and may be supported in bores or recesses in the opposed faces of the respective duct members 41 and 42, permitting rotation of the pivots but otherwise restricting their movement. It will be apparent that by rotating the damper carrying structure 43 relative to the ducts 41 and 42, the damper elements will be moved from closed to open position or vice versa, depending upon the direction of relative rotation of the members.

Suitable means may be provided for rotating the damper carrying structure 43 relative to the duct members 41 and 42, that illustrated in Fig. 8 comprising a pinion gear 53 carried by a shaft 54 extending through the wall of the duct 41 and supported, for example, by a suitable bearing structure indicated generally by the numeral 55. Cooperable with the pinion 53 is a series of rack teeth 56 mounted on the upper edge of the tubular member 44, whereby the structure 43 may be rotated about the axis of the duct by rotating the shaft 54 and the beveled pinion 53. An actuating handle 57 may be provided for rotating the shaft 54 and may be cooperable with an index plate 58 for indicating the operative position of the dampers. Obviously, if desired, the shaft 54 could be actuated by mechanical means suitable for remote control operation, as for example, selsyn motors.

The toroidal construction may also be actuated manually in a manner to that illustrated in Fig. 6, such a construction being illustrated in Fig. 9, wherein the outer tubular member 44 of the assembly 43 is provided with a manually actuatable handle or knob 58 rigidly carried by the member 44 and extending through a circumferential slot 59 in the duct wall 41. Air flow through the slot 59 may be restricted by any suitable means, as for example, a sliding plate 61, rigidly carried by the knob 58 and of a length to cover the slot 59 throughout the movement of the actuating knob 58. The free edges of the plate 61 may be operatively sealed by flanged ribs 62 extending along the longitudinal edges of the plate and overlying the same to provide an effective seal. If desired additional sealing means such as felt or other material may likewise be utilized.

In the construction illustrated in Fig. 9, axial movement of the member 44 relative to the duct 41 may be restricted by internally extending flange members 47 and 47' on the duct wall.

Figs. 10 and 11 illustrate another modification of the present invention, wherein the damper elements are supported within the duct structure by means extending along the leading edge of the damper element. In this construction the duct 63 is provided with a damper supporting spider 64 having a radially extending arm 65 for each damper element of the assembly. The walls or plates 66 and 67 may be pivoted together in substantially the same manner as previously described for the other damper elements. Thus each adjacent wall 66 and 67 is provided with alternate lugs 68 through which extends a pivot pin or pintle 69, and in like manner the adjacent edges of the walls 66 are provided with hinge lugs 71 through which extends a pivot pin 72, the lugs 71, however, being so arranged that intermediate gaps are left between each pair of lugs 71 on the respective walls 66, and cooperable therewith are a plurality of lugs 73 on the radially extending arm 65 which are adapted to occupy the gaps between pairs of lugs 71, with the pin 72, as clearly illustrated in Fig. 10, being adapted to pass through the lugs 73 as well as the lugs 71, thereby hingedly connecting both walls 66 to the supporting arm 65 of the spider 64. In like manner the adjacent edges of the walls 67 may be hinged together by a pin 74 passing through similar lugs 71 and lugs 73 on a strip 75 generally corresponding to the radial arm 65.

The damper element illustrated in Fig. 10 may be actuated from open to closed position and vice versa by an actuating arm 76, generally corresponding to the arms 21 of the construction illustrated in Fig. 3, which may be operated by any suitable structure such as that heretofore described for operating the arms 21 in the constructions illustrated in Figs. 3, 4 and 5. As clearly illustrated in Fig. 11, the arm 76 may be operatively connected to the damper element through the member 75, the arm being illustrated as pivotally connected to the member by a suitable pin 77 or the like passing through the member and the bifurcated portion 78 of the arm 76.

It will be appreciated that in the construction illustrated in Figs. 10 and 11 the leading edge of the damper element remains on the fixed axis of the pin 72, with the walls 66 being movable from a partially open position, illustrated in Figs. 10 and 11, to a fully open position wherein the plates approach a completely folded relation, to a position where the plates 66 approach the plane of the pins 72 of the damper elements of the entire assembly, the arm 76 and its connection to the member 75 having sufficient rigidity to confine the axis of the pin 74 connecting the leaves 67 to movement in a single plane passing through the axis of the pin 72 connecting the leaves 66, as a result of which the opening and closing action is efficiently achieved. If desired, additional guiding means may be provided, as for example, the member 75 may be extended, as indicated at 79, adjacent the apex of the damper element and adapted to be positioned in a slot 81 located in the central portion 82 of the supporting spider 64. Thus as the damper element is moved from the position illustrated in Fig. 10 to a duct-closing position, the portion 79 of the member 75, being restricted by the slot 81 to a planer movement, may cooperate with the arm 76 to prevent the walls of the damper element from twisting or otherwise moving out of their desired paths.

Fig. 12 illustrates, in semi-diagrammatic form, the utilization of the present invention to a rectangular duct, the damper construction, for the purposes of illustration, being similar to that heretofore described in connection with Figs. 10 and 11, wherein a spider indicated generally by the numeral 83 may be provided with a plurality of radially extending arms 84 and 85, the former extending from the axis of the duct to the center of each side wall 86 thereof, while the arms 85 may extend from the axis to the four corners of the duct as illustrated. With this construction, while all of the leaves operate in the same manner as heretofore described, the exact shape of the leaves differs slightly as the damper elements 87 in the corners of the duct preferably will be of a length to provide the base edges which will conform to the duct side walls when the damper elements are in a closed position, as illustrated in Fig. 12, whereas the damper elements 87' extending from the axis of the central portion of the side walls, may be of a shape similar to that illustrated in Fig. 10, with the exception that the base edges are likewise constructed to conform to the flat wall of the duct. The actuating mechanism for this arrangement obviously could be the same as that described in connection with Figs. 3, 5 or 10.

It might also be mentioned that a combination of the structures of Figs. 1, 2 and 10 could be utilized, wherein a spider similar to the spider 64 may be mounted for non-rotatable, axial movement in the duct, with the damper elements carried by the arms of the spider in the manner illustrated in Fig. 10. Pivots generally similar to the pivots 16 may be utilized to support the damper elements adjacent the pivotal connections of the walls 66 and 67, the pivots being positioned in circumferentially extending slots corresponding to the slots 15 of the construction illustrated in Figs. 1 and 2, and serving the same function of restricting movements of the pivots primarily to a circumferential path. Thus axial movement of the spider toward such pivots would result in a closing of the damper structure, and in the opposite direction, would result in opening of the damper structure. Any suitable means could be utilized for moving the spider.

It will be particularly noted from the above description that I have provided a novel damper structure which is extremely flexible in design, enabling its use in ducts of varying sizes and shapes, including annular or toroidal ducts. Likewise the collapsible vane type structure provides quiet and efficient operation, coupled with a more symmetrical flow arrangement through the damper structure than could be obtained with prior parallel types of damper structures.

It will be readily appreciated by those skilled in the art that the present invention may be utilized in conjunction with damper structures other than the specific examples illustrated in the drawings to achieve the desired results, hence I do not wish to be understood as limiting myself to the exact form, construction, arrangement and combination of parts herein shown and described, or uses mentioned.

What I claim as new and desire to secure by Letters Patent is:

1. In a damper structure, the combination of a duct, a plurality of damper elements radially disposed about the longitudinal axis of the duct to form a unitary damper assembly, each damper element comprising four walls generally trapezoidal in shape, means pivotally connecting adjacent side edges of said walls to produce a collapsible pyramid structure, at least two of said means being pivot pins mounted for movement in a plane perpendicular to said longitudinal duct axis, each of said pyramid structures having two collapsed positions, one collapsed position being generally in a plane perpendicular to the longitudinal axis of the duct to close off said duct and the other collapsed position being generally in a plane containing the longitudinal axis of the duct to open said duct, and means for simultaneously moving all of said damper elements to open and closed positions.

2. A damper structure according to claim 1, wherein said damper elements are truncated pyramid structures.

3. A damper structure according to claim 2, wherein a second duct is coaxially mounted within said first-mentioned duct.

4. In a damper structure, the combination of a plurality of damper elements, each comprising four walls pivotally connected one to the other along their adjacent edges, the pivotal axes thereof extending in converging directions, a duct member, said damper elements being assembled in co-operable relation radially disposed within the duct member about the axis of the duct member with their pivotal axes extending towards said axis of the duct member, means for supporting said damper elements within the duct member for movement of the walls with their respective pivotal axes whereby a pair of walls of each damper element may extend either in the same general direction as said axis of the duct member or in a direction transverse thereto, actuating means operatively connected to each damper element for simultaneously adjusting all of said damper elements, said actuating means comprising a movable member operable along the axis of said duct member, a plurality of arms, each operatively connecting said movable member and a respective damper element for transmitting movement of said movable member thereto to selectively open and close said damper elements, and means for selectively moving said movable member.

5. In a damper structure, the combination of a plurality of damper elements, each comprising four walls pivotally connected one to the other along their adjacent edges, the pivotal axes thereof extending in converging directions, a duct member, said damper elements being assembled in co-operable relation radially disposed within the duct member about the axis of the duct member with their pivotal axes extending towards said axis of the duct member, means for supporting said damper elements within the duct member for movement of the walls with their respective pivotal axes whereby a pair of walls of each damper element may extend either in the same general direction as said axis of the duct member or in a direction transverse thereto, actuating means operatively connected to each damper element for simultaneously adjusting all of said damper elements, said actuating means comprising a movable member operable along the axis of said duct member, a plurality of arms, each operatively connecting said movable member and a respective damper element for transmitting movement of said movable member thereto to selectively open and close said damper elements, and spring means biasing said movable member in a predetermined axial direction, an armature connected to said movable member, and a solenoid winding co-operable, when energized, with said armature for moving the same and said movable member in the opposite axial direction.

6. In a damper structure, the combination of a duct, a plurality of damper elements assembled in cooperable relation radially disposed about the axis of said duct, each damper element comprising four walls pivotally connected one to the other along their adjacent side edges, the configuration of the walls being such that their pivotal axes extend in converging directions to a common center located on the axis of the duct, means for supporting said damper elements with at least one pivotal axis of each element being disposed in a common plane extending normal to said duct axis, and a pair of opposed axes of each element disposed in a respective radially extending plane containing the duct axis, the walls of said elements being movable about their respective axes whereby a pair of walls of each damper element at the same side of said normal plane may be adjusted from positions approaching said normal plane to positions approaching the radial plane of the respective damper element, means operatively connecting said damper elements for simultaneously effecting like adjustments of said damper elements, two of said pivotal axes of each damper element lying in said normal plane, and said means for simultaneously effecting like adjustments of each damper element operatively connected thereto adjacent one of the pivotal axes lying in said radial plane.

7. In a damper structure, the combination of a duct, a plurality of damper elements assembled in cooperable relation radially disposed about the axis of said duct, each damper element comprising four walls pivotally connected one to the other along their adjacent side edges, the configuration of the walls being such that their pivotal axes extend in converging directions to a common center located on the axis of the duct, means for supporting said damper elements with at least one pivotal axis of each element being disposed in a common plane extending normal to said duct axis, and a pair of opposed axes of each element disposed in a respective radially extending plane containing the duct axis, the walls of said elements being movable about their respective axes whereby a pair of walls of each damper element at the same side of said normal plane may be adjusted from positions approaching said normal plane to positions approaching the radial plane of the respective damper element, means operatively connecting said damper elements for simultaneously effecting like adjustments of said damper elements, means for so restricting movement of the damper element along two opposed pivotal axes that corresponding points therealong move in circumferential directions relative to the axis of the duct, and said means for simultaneously effecting like adjustments of said damper elements operatively connected thereto adjacent one of the other pivotal axes.

References Cited in the file of this patent
UNITED STATES PATENTS

| | | |
|---|---|---|
| 1,270,327 | Richardson | June 25, 1918 |
| 1,989,010 | Howard | Jan. 22, 1935 |
| 2,233,983 | Kice | Mar. 4, 1941 |
| 2,505,996 | Simpelaar | May 2, 1950 |
| 2,672,088 | Orr | Mar. 16, 1954 |